(12) United States Patent
Collins-Dippel

(10) Patent No.: US 11,828,641 B2
(45) Date of Patent: Nov. 28, 2023

(54) VIBRATING FORK LIQUID LEVEL SWITCH WITH VERIFICATION

(71) Applicant: Rosemount Inc., Shakopee, MN (US)

(72) Inventor: Sean Daniel Collins-Dippel, Minneapolis, MN (US)

(73) Assignee: ROSEMOUNT INC., Shakopee, MN (US)

( * ) Notice: Subject to any disclaimer, the term of this patent is extended or adjusted under 35 U.S.C. 154(b) by 0 days.

(21) Appl. No.: 17/699,526

(22) Filed: Mar. 21, 2022

(65) Prior Publication Data

US 2023/0296421 A1    Sep. 21, 2023

(51) Int. Cl.
*G01F 23/22*    (2006.01)
*G01F 25/20*    (2022.01)
*G01F 23/296*   (2022.01)

(52) U.S. Cl.
CPC ............. *G01F 23/22* (2013.01); *G01F 25/20* (2022.01); *G01F 23/2967* (2013.01)

(58) Field of Classification Search
CPC .. G01F 23/2966; G01F 23/2967; G01F 25/20; G01F 25/24
See application file for complete search history.

(56) References Cited

U.S. PATENT DOCUMENTS 5,743,134 A * 4/1998 Dreyer ................ G01F 23/2967
                                                73/290 V
6,389,891 B1   5/2002  D'Angelico et al.
6,997,052 B2   2/2006  Woehrle
8,037,753 B2  10/2011  Fehrenbach et al.
10,571,329 B2  2/2020  Tzegazeab et al.
10,982,991 B2  4/2021  Sears et al.
(Continued)

FOREIGN PATENT DOCUMENTS

CN     1416522     5/2003
CN   100 406 862   7/2008
CN    102460090   12/2014

OTHER PUBLICATIONS

Office Action from U.S. Appl. No. 16/322,582, dated Nov. 4, 2020.
(Continued)

*Primary Examiner* — Herbert K Roberts
(74) *Attorney, Agent, or Firm* — Westman, Champlin & Koehler, P.A.

(57) ABSTRACT

A vibrating fork liquid level switch includes a vibrating fork assembly arranged to vibrate at a first frequency when in contact with a process fluid and at a second frequency when in contact with air. A drive circuit connected to the vibrating fork assembly is configured to drive the vibrating fork assembly into oscillation. Sense circuitry senses an oscillation frequency of the vibrating fork assembly. Output circuitry provides a first output when the sensed oscillation is at the first frequency and a second output when the sensed oscillation is at the second frequency. Control circuitry controls power applied to the vibrating fork assembly by the drive circuit between a first and a second power level. Verification circuitry verifies the oscillation frequency of the vibrating fork assembly when power applied to the vibrating fork assembly by the drive circuitry is changed.

22 Claims, 3 Drawing Sheets

(56) References Cited

U.S. PATENT DOCUMENTS

| | | | |
|---|---|---|---|
| 2004/0183550 A1* | 9/2004 | Fehrenbach | G01F 23/14 |
| | | | 324/662 |
| 2004/0244481 A1 | 12/2004 | Woehrle | |
| 2005/0209796 A1 | 9/2005 | Kolosov et al. | |
| 2006/0144136 A1 | 7/2006 | Dutton et al. | |
| 2007/0186646 A1 | 8/2007 | Frick et al. | |
| 2007/0272209 A1 | 11/2007 | Matsiev et al. | |
| 2008/0243418 A1 | 10/2008 | Woodard et al. | |
| 2011/0226054 A1* | 9/2011 | Sears | G01F 25/20 |
| | | | 73/290 V |
| 2012/0111106 A1 | 5/2012 | Smallwood | |
| 2016/0059153 A1 | 3/2016 | Smith et al. | |
| 2017/0038491 A1* | 2/2017 | Gonzalez | G01N 11/16 |

OTHER PUBLICATIONS

First Office Action from Chinese Patent Application No. 201780049126. X, dated Jun. 16, 2020.
Notification of Transmittal of the International Search Report and the Written Opinion of the International Searching Authority from International Application No. PCT/GB2017/052245, dated Nov. 17, 2017.
Search Report from GB Application No. 1613381.1, dated Nov. 16, 2016.
Quick Start Guide, Rosemount 2140 and 2140:SIS Level Detectors, Vibrating Fork, 00825-0100-4140, Rev AD, Jul. 2021.
Safety Manual, Rosemount 2140:SIS Level Detector, Vibrating Fork, 00809-0200-4140m, Rev CA, Mar. 2021.
Notification of Transmittal of International Search Report and the Written Opinion of the International Searching Authority, or the Declaration, from PCT/US2023/062999, dated Jun. 6, 2023.

* cited by examiner

VIBRATING FORK LIQUID LEVEL SWITCH WITH VERIFICATION

BACKGROUND

The present invention relates to vibrating fork liquid level switches of the type used to detect level of a liquid process fluid. More specifically, the present invention relates to verification of operation of a vibrating fork liquid level switch.

Vibrating fork level switches are commonly used to detect when the surface of a fluid in a tank is at a particular level, that level being the height at which the fork is positioned in the tank. Typically vibrating fork level switches are configured to self-oscillate through a positive feedback loop in an electronic circuit where the phase delay between the transmitting and receiving elements is carefully tuned to ensure the positive feedback signal is in phase.

In operation, in "normally dry" applications, the frequency of vibration will be at one level when the fork is in air ('dry'), but will drop when the liquid in the tank rises into contact with the fork ('wet'). In "normally wet" applications the reverse applies and the frequency will rise as the liquid falls below the level of the fork.

It is desirable to verify operation of a vibrating fork level switch to ensure that it can accurately detect level of a process fluid. One type of verification process requires an operator to change process conditions. In such a verification test (or "proof test"), an operator monitors an output from the liquid level switch while liquid level is adjusted such that the fork of the switch changes from a wet condition, to a dry condition or from a dry condition to a wet condition. The operator monitors the output from the vibrating fork level switch to ensure that the output changes within an expected time period. However, such a test is problematic for a number of reasons. For example, the test can result in a tank being over filled if the switch fails or an occurrence of a safety event while performing a proof test. Further, the test requires an operator to manually control the liquid level.

SUMMARY

A vibrating fork liquid level switch includes a vibrating fork assembly arranged to vibrate at a first frequency when in contact with a process fluid and at a second frequency when in contact with air. A drive circuit connected to the vibrating fork assembly is configured to drive the vibrating fork assembly into oscillation. Sense circuitry senses an oscillation frequency of the vibrating fork assembly. Output circuitry provides a first output when the sensed oscillation frequency is at the first frequency and a second output when the sensed oscillation frequency is at the second frequency. The first and second outputs are each indicative of one of a wet and dry condition. Control circuitry controls power applied to the vibrating fork assembly by the drive circuit between a first and a second power level. Verification circuitry verifies the oscillation frequency of the vibrating fork assembly when power applied to the vibrating fork assembly by the drive circuit is changed.

DETAILED DESCRIPTION OF ILLUSTRATIVE EMBODIMENTS

Figure 1:
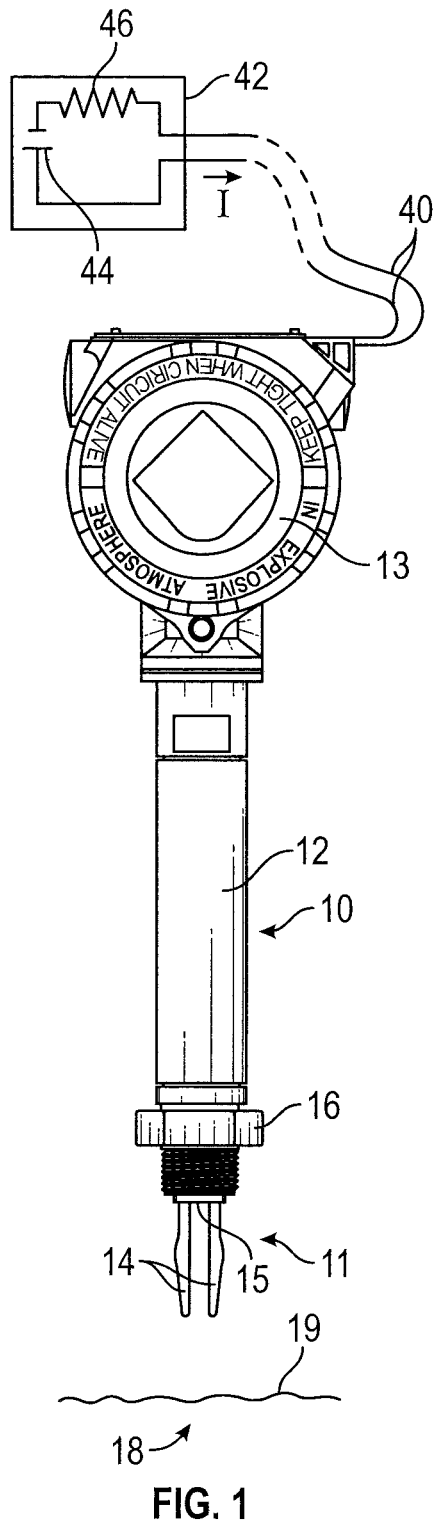
FIG. 1 shows a vibrating fork level switch in air.
Figure 2:
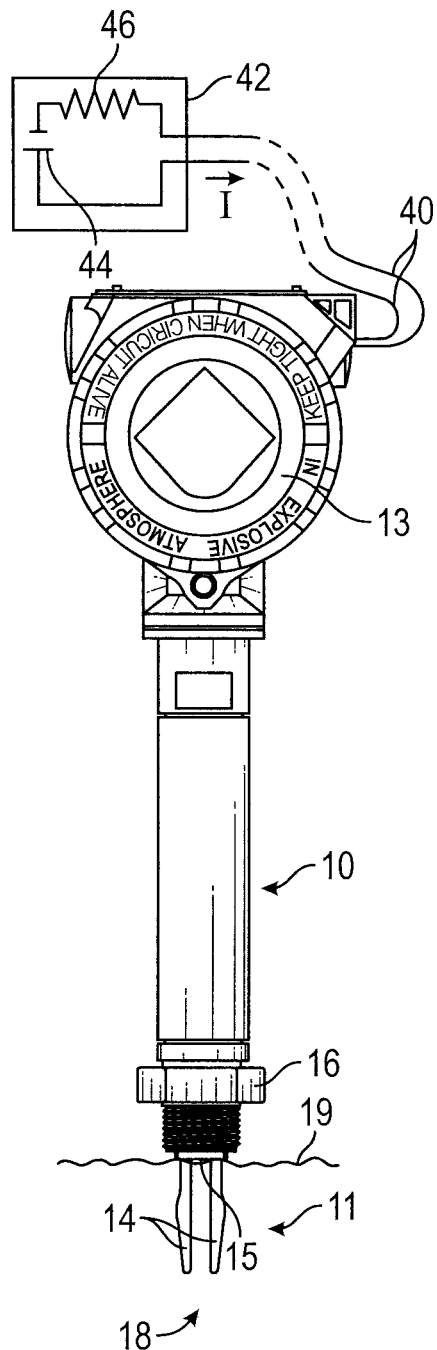
FIG. 2 shows the fork or sensor of the switch of FIG. 1 fully immersed in a medium (process fluid) with which it is to be used.

Referring firstly to FIGS. 1 and 2, the present invention provides a vibrating fork level switch 10. In the configuration shown, the switch 10 includes a level sensor in the form of fork assembly 11 mounted at one end of tube 12. A housing 13 is mounted on the opposite end of tube 12. The fork assembly 11 comprises a pair of tines 14 extending from a diaphragm 15. The tube 12 typically includes a mounting 16 to allow the device to be mounted on the wall of a process vessel and contained within the housing 13 are the operating electronics which include a microcontroller (not shown in FIGS. 1 and 2). The switch 10 may be battery powered and include an antenna to allow the switch to communicate wirelessly with a remote control facility.

In one configuration, an output from the switch 10 is provided on a two-wire process control loop 40. In a specific configuration, the two-wire process control loop 40 is a 4-20 mA process control loop in which different values of current flowing through the loop provide an indication of different conditions of the switch 10. For example, an off or low liquid level condition can be provided by setting the current through the process control loop 40 to a low value of 8 mA. Similarly, an on or high liquid level condition can be provided by setting the current through process control loop 40 to a 16 mA value. High and low error alarms can be provided by adjusting the process control loop current to extreme conditions, i.e., 4 mA and/or 20 mA. The two-wire process control loop can also be used to provide power to the switch 10. Information can be transmitted to a remote location such a process control room 42 which is illustrated as a power source 44 and an electrical resistance 46. In some configurations, the process control loop can also be used to carry digital commands and information, for example, in accordance with the HART® communication protocol. In general, as used herein, a process control loop refers to both a wired configuration such as illustrated in FIGS. 1 and 2, as well as a wireless configuration in which information is transmitted using radio frequency. Example wireless process control loops include WirelessHART® (IEC 62591) or ISA 100.11a (IEC 62734), or another wireless communication protocol, such as WiFi, LoRa, Sigfox, BLE, or any other suitable protocol including a custom communication protocol. Another example output is simply a switch which changes between open and closed positions based upon the sensed liquid level.

The operation of this type of device requires a knowledge of the dry fork frequency (DFF), the natural or resonant frequency at which the fork assembly 11 vibrates in air. This is typically established at the point of manufacture, but may also be established or adjusted when the switch is installed in a working environment. In FIG. 1 the switch 10 is shown in air above a medium (process fluid) 18. As the surface 19 of the medium 18 rises and comes into contact with the fork assembly 11, the frequency of vibration of the fork falls and, at a predetermined change in frequency from the DFF, the switch 10 will operate. Generally, the switch 10 is configured so that the switching point corresponds to a defined level of immersion of the fork assembly 11 in the medium 18. However, because changes in frequency of the fork 11 will vary with changes in density of the medium 18, the switching point can also vary.

During operation as well as during installation and testing of switch 10, it is important to be able to verify proper operation of the circuitry. One verification test is known as a partial proof test and the switch 10 is caused to enter a testing mode. This can be through the receipt of a command or through some type of a local user input. When the switch enters the test mode, an output on the two-wire process control loop 30 is set for a predetermined period of time to a low alarm value, for example a 4 mA value. After this time period expires, the output is raised to an off or low indication value, for example 8 mA for a second period of time. After the expiration of the second period of time, the output on the two-wire process control loop 40 is adjusted to an on or high output level, for example 16 mA for a third period of time. After expiration of this third period of time, a high alarm value is placed on the process control loop 30, for example, 20 mA until the expiration of the test.

Measuring circuitry and switch 10 monitors the current level present on the two-wire process control loop during the proof test and provides a verification error output if the various measured current levels are outside of a predetermined range from their correct value. Such a proof test is useful in testing the output circuitry of the switch. However, it may be desirable to test additional aspects of the switch 10 as discussed herein.

Figure 3:
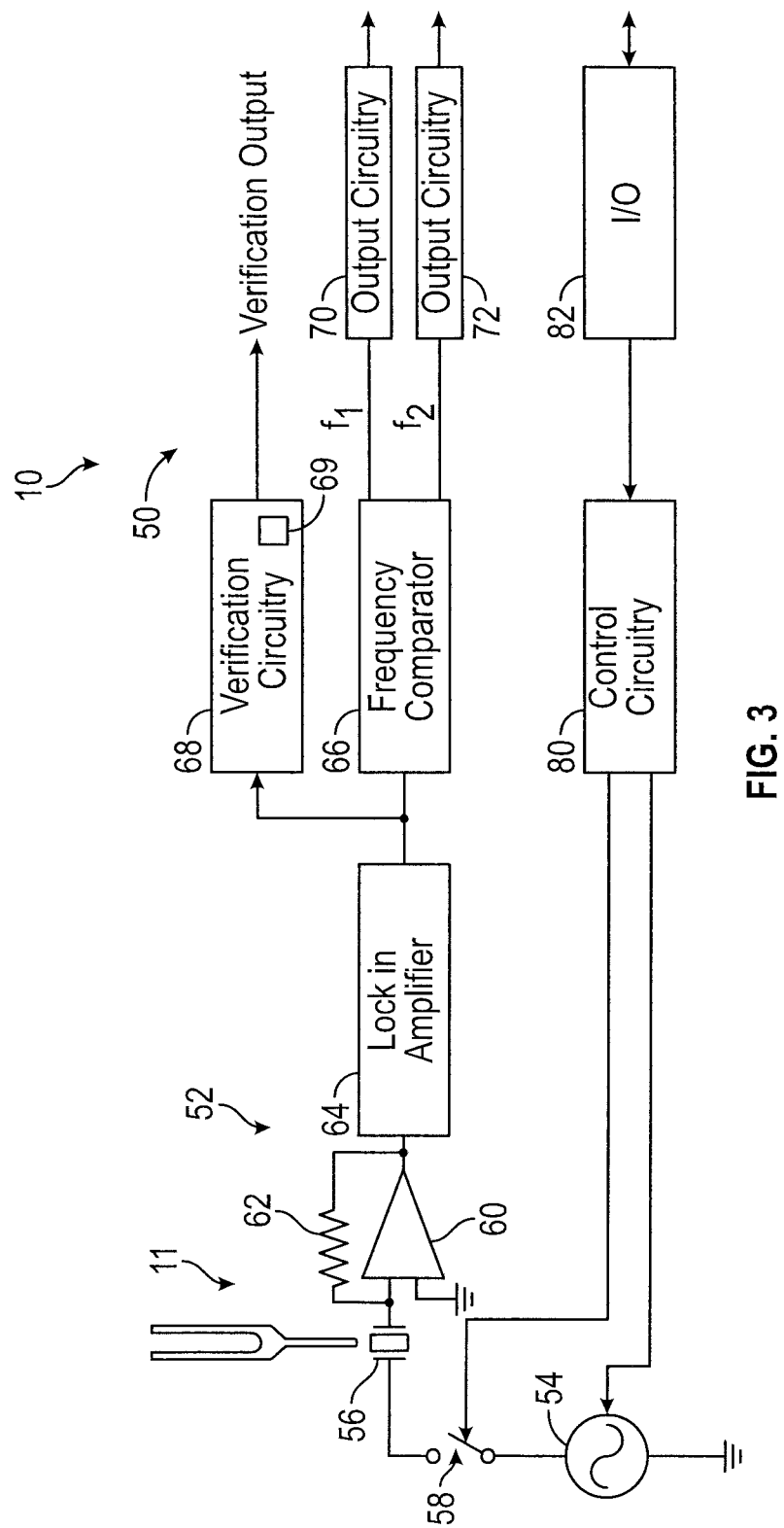
FIG. 3 is a simplified block diagram showing electrical circuitry of the vibrating fork assembly level switch of FIGS. 1 and 2.

FIG. 3 is a simplified schematic diagram showing electrical circuitry 50 of vibrating fork level switch 10. Circuit 50 includes sensor circuitry 52 coupled to the tuning fork assembly 11. Circuitry 52 includes an oscillator 54 connected to a piezoelectric stack 56 through a switch 58. Stack 56 is physically coupled to tuning fork assembly 11, for example, through diaphragm 15 shown in FIGS. 1 and 2. The stack 56 is also coupled to an operational amplifier 60 having a feedback resistance 62 and an output connected to a lock-in amplifier 64. An output from the lock-in amplifier 64 is provided to a frequency comparator 66 and verification circuitry 68. Verification circuitry 68 provides a verification output as discussed herein. Frequency comparator 66 provides a first output $f_1$ and a second output $f_2$ to output circuitry 70 and 72, respectively. The outputs $f_1$ and $f_2$ provide an indication that the vibrating fork assembly 14 is vibrating at a first frequency $f_1$ indicating that the fork is not in contact with process fluid 18 and is, for example, contacting air, and a second frequency indicating that the vibrating fork assembly 11 has been submerged in process fluid 18. Control circuitry 80 is used to control operation of oscillator 54 and switch 58 and is optionally configured to receive a command from input/output circuitry 82.

During operation, the switch 10 is used to monitor level of process fluid 18 as discussed above based upon the frequency of the vibrating fork assembly 11. The system is configured to enter a proof testing mode in which operation of the vibrating fork is verified. The proof testing mode can be initiated based upon any criteria. For example, a command can be received from the control room 42 using input/output 82 over process control loop 40, a command can be received wirelessly, a command can be received through I/O 82 from a local user interface or the control circuitry 80 can initiate proof testing based upon its own criteria such as periodically.

Verification circuitry monitors a frequency of the vibrating fork assembly based upon an output from the lock-in amplifier 64. When the proof test is initiated, the verification circuitry obtains a first frequency measurement $f_{initial}$. This information is stored, for example in memory 69. Next, the control circuitry 80 opens switch 58 and disconnects the oscillator from the piezoelectric stack 56. After a user selectable period of time, or a fixed period of time, control circuitry closes the switch 58 whereby vibrating fork assembly 11 begins vibrating again in response to vibration input from piezoelectric stack 56. At this time, verification circuitry obtains a second frequency measurement $f_{final}$. This second frequency measurement is compared with the first frequency measurement stored in memory 69. The comparison can be performed within verification circuitry 68 or by control circuitry 80. If the first and second frequencies differ by more than a predetermined or user selectable amount, a determination is made that there is a failure, or an impending failure, in the sensor circuitry 52. This may be due to changes in the vibrating fork assembly, variations in the piezoelectric stack 56, or other changes in the electronics associated with circuitry 52. Based upon this comparison, the verification output is provided which can indicate that the switch 10 is operating properly or that the switch 10 is operating outside of specifications. The verification output can, for example, be an alarm signal provided on process control loop 40, a digital communication signal provided on process control loop 40, a wireless signal communicated over a wireless process control loop, an output provided through a local operator interface or an output provided locally through a wireless communication link to a wireless local operator interface, etc. In this configuration, the power applied to the vibrating fork assembly is adjusted between an operational level and a no (or zero) power level. The operational level can be the power level used during normal operation, or some other power level.

Figure 4:
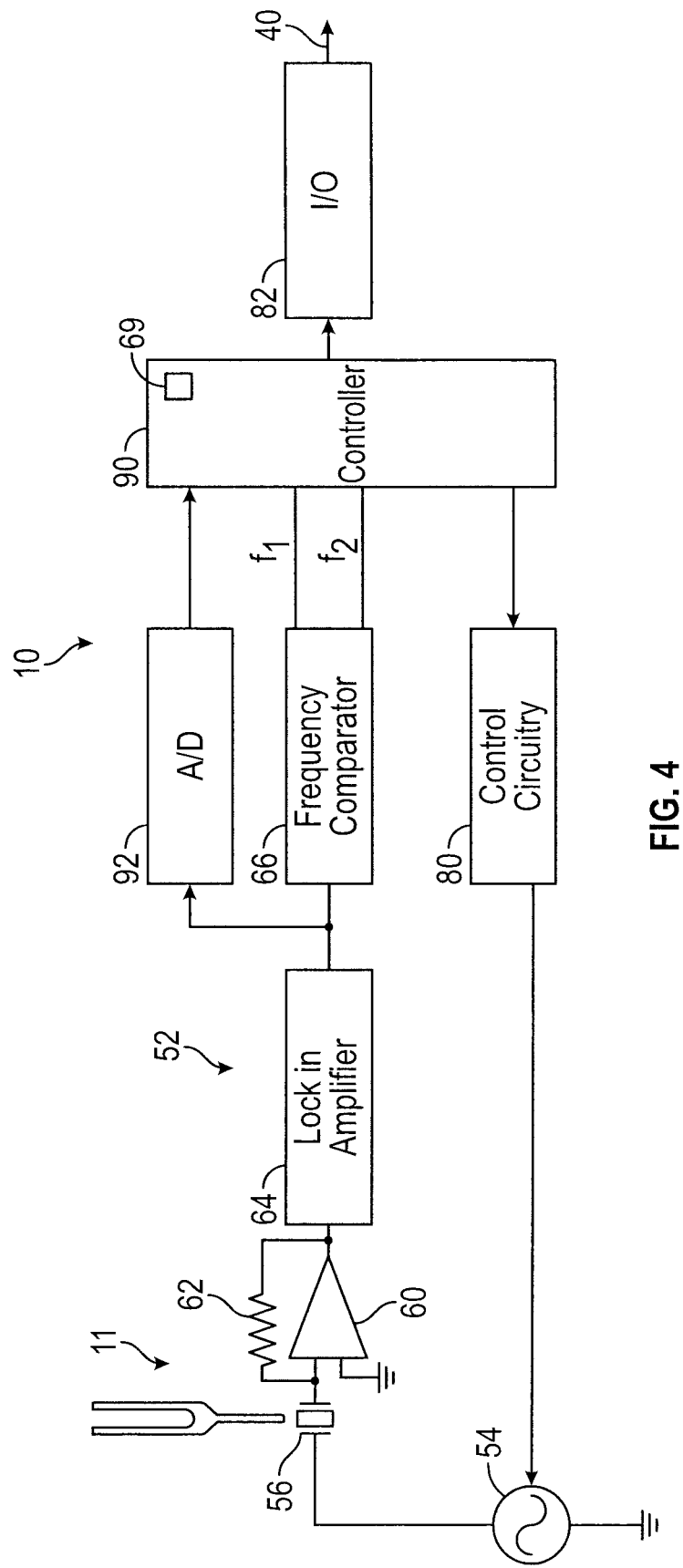
FIG. 4 is another example embodiment of electrical circuitry of the vibrating fork assembly level switch of FIGS. 1 and 2.

FIG. 4 is a simplified schematic diagram of another example configuration of vibrating fork liquid level switch 10. In the configuration of FIG. 4, an analog to digital converter 92 is used to digitize the output from lock-in amplifier 64 and provide a digital signal to a controller 90. In another example configuration, circuit 92 comprises a frequency to digital converter such that a digital frequency value of the output from lock-in amplifier 64 is provided to controller 90. In either case, controller 90 determines a frequency of the output from the lock-in amplifier 64 and operates as verification circuitry 68 shown in FIG. 3. Thus, controller 90 compares the frequency at which the vibrating fork assembly 70 is vibrating with a prior frequency measurement stored in memory 69 in order to verify operation of circuitry 52. In a related configuration, the operation of frequency comparator 66 and analog to digital converter 92 are performed in a single function block either alone or in combination with controller 90.

The controller 90 controls operation of control circuitry 80. In this configuration, rather than using a switch 58, the control circuitry 80 can be used to directly disable and de-energize oscillator 54. In another example configuration, the control circuitry 80 is used to adjust the power provided by oscillator 50 to piezoelectric stack 56. For example, the power provided to piezoelectric stack 56 can be reduced or increased, and a second frequency measurement obtained by analog to digital converter 92 and controller 90. In such a configuration, variations in frequency, or drift in frequency, of the vibrating fork assembly 11 can be monitored as a function of the power input provided to piezoelectric stack 56. Variations in this measured frequency may indicate a failure or impending failure of circuitry 52.

Based upon comparisons of measured frequency, for example before, during, and/or after adjusting the power provided to the vibrating fork assembly 56, operation of circuitry 52 is verified. Based upon this comparison, the controller 90 can provide a verification output to process control loop 40 through input/output circuitry 82. During normal operation, controller 90 is also used to provide the liquid level indication based upon frequencies $f_1$ and $f_2$ as discussed above. As previously discussed, the input/output circuitry 82 can provide outputs locally, remotely using a wired connection such as two-wire process control loop 40, or through a wireless connection such as in accordance with the WirelessHART® protocol.

Although the present invention has been described with reference to preferred embodiments, workers skilled in the art will recognize that changes may be made in form and detail without departing from the spirit and scope of the invention. The various outputs and inputs discussed herein can be provided locally, received from a remote location, or a combination of local and remote communication. The output can be used to directly drive a control element, for example a valve and/or can be communicated to a local or remote location. The proof testing of the output circuitry discussed herein can be performed as an optional component of the verification test. The various functions discussed in connection with the functional blocks of FIGS. 3 and 4 can be performed by individual circuitry, a combination of circuits, through digital implementation including the use of a microprocessor or microcontroller, etc. Other types of circuits may be used to cause the fork assembly 11 to oscillate and the circuitry shown herein is simply one example. During verification, the power applied to the piezoelectric stack is applied at a first power level and the frequency is measured. Subsequently the power applied to the piezoelectric stack is adjusted to a second power level and the frequency is optionally measured. Finally, the power applied to the piezoelectric stack is adjusted back to the first power level and the frequency is again measured. Operation of the vibrating fork liquid level switch is verified by observing one or more of the frequency measurements. For example, this can be by comparing the frequencies measured at the first power level.

What is claimed is:

1. A vibrating fork liquid level switch, comprising:
   a vibrating fork assembly arranged to vibrate at a first frequency when in contact with a process fluid and at a second frequency when in contact with air;
   a drive circuit comprising an oscillator connected to the vibrating fork assembly configured to drive the vibrating fork assembly into oscillation;
   sense circuitry configured to sense an oscillation frequency of the vibrating fork assembly;
   output circuitry configured to provide a first output when the sensed oscillation is at the first frequency and a second output when the sensed oscillation is at the second frequency;
   control circuitry configured to control power applied to the vibrating fork assembly by the oscillator of the drive circuit between a first and a second power level; and
   verification circuitry configured to verify the oscillation frequency of the vibrating fork assembly when power applied to the vibrating fork assembly by the oscillator of the drive circuitry is changed.

2. The vibrating fork liquid level switch of claim 1 including a switch configured to be operated by the control circuitry to selectively disconnect the drive circuit from the vibrating fork assembly, and thereby control the power applied to the vibrating fork assembly.

3. The vibrating fork liquid level switch of claim 2 wherein the verification circuitry is configured to measures a first oscillation frequency of the vibrating fork assembly when the switch is closed.

4. The vibrating fork liquid level switch of claim 3 where in the control circuit is configured to opens the switch for a period of time and subsequently closes the switch, and the verification circuity is configured to measures a second oscillation frequency of the vibrating fork assembly when the switch is subsequently closed.

5. The vibrating fork liquid level switch of claim 4 including a frequency comparator configured to verify the oscillation frequency of the vibrating fork assembly by comparing the first and second oscillation frequencies.

6. The vibrating fork liquid level switch of claim 1 wherein the control circuitry is configured to adjusts a power level applied by the drive circuit to the vibrating fork assembly.

7. The vibrating fork liquid level switch of claim 1 wherein the control circuitry is configured to controls power applied to the vibrating fork assembly by the drive circuit to the first power level, subsequently to the second power level and subsequently to the first power level.

8. The vibrating fork liquid level switch of claim 7 wherein the verification circuitry is configured to measures the oscillation frequency when the drive circuit is at the first power level prior to the second power level.

9. The vibrating fork liquid level switch of claim 8 wherein the verification circuit is configured to measures a second oscillation frequency of the vibrating fork assembly when the drive circuit is operated at the first power level subsequent to being operated at the second power level.

10. The vibrating fork liquid level switch of claim 9 wherein the verification circuitry is configured to compares the first oscillation frequency with the second oscillation frequency and responsively provides a verification output.

11. The vibrating fork liquid level switch of claim 1 wherein the verification circuitry is implemented in a microcontroller.

12. The vibrating fork liquid level switch of claim 1 wherein a the verification circuitry is configured to perform a verification test in response to a receipt of a command received locally.

13. The vibrating fork liquid level switch of claim 1 wherein a the verification circuitry is configured to perform a verification test in response to a receipt of a command received from a remote location.

14. The vibrating fork liquid level switch of claim 1 wherein the first and second outputs are provided on a two-wire process control loop.

15. A method for operating a vibrating fork liquid level switch, comprising:
   causing a vibrating fork assembly to vibrate at a first frequency when in contact with a process fluid and at a second frequency when in contact with air;
   driving the vibrating fork assembly into oscillation using an oscillator of a drive circuit;
   sensing an oscillation frequency of the vibrating fork assembly; and
   providing a first output when the sensed oscillation is at a first frequency and a second output when the sensed oscillation is at a second frequency;
   controlling power applied to the vibrating fork assembly from the oscillator between a first and a second power level; and
   verifying operation of the vibrating fork liquid level switch based upon frequency of the vibrating fork assembly when power applied to the vibrating fork assembly from the oscillator is changed.

16. The method of claim 15 including controlling a switch to selectively disconnect drive circuit from the vibrating fork assembly.

17. The method of claim 15 includes adjusting a power level applied by the drive circuit to the vibrating fork assembly.

18. The method of claim 15 including controlling power applied to the vibrating fork assembly to the first power level, subsequently to the second power level and subsequently to the first power level.

19. The method of claim 15 wherein verifying includes measuring the oscillation frequency when vibrating fork assembly is at the first power level prior to the second power level.

20. The method of claim 19 wherein verifying includes measuring a second oscillation frequency of the vibrating fork assembly when the drive circuit is operated at the first power level subsequent to being operated at the second power level.

21. The method of claim 20 wherein verifying includes comparing the first oscillation frequency with the second oscillation frequency and responsively provides a verification output.

22. The method of claim 15 wherein the verifying is performed in response to a receipt of a command.

\* \* \* \* \*

UNITED STATES PATENT AND TRADEMARK OFFICE
CERTIFICATE OF CORRECTION

| | | |
|---|---|---|
| PATENT NO. | : 11,828,641 B2 | Page 1 of 1 |
| APPLICATION NO. | : 17/699526 | |
| DATED | : November 28, 2023 | |
| INVENTOR(S) | : Sean Daniel Collins-Dippel | |

It is certified that error appears in the above-identified patent and that said Letters Patent is hereby corrected as shown below:

In the Claims

Column 6, Claim 3, Line 2, please replace the word "measures" with the word --measure--.

Column 6, Claim 4, Line 6, please replace the word "opens" with the word --open--.

Column 6, Claim 4, Line 7, please replace the word "closes" with the word --close--.

Column 6, Claim 4, Line 8, please replace the word "measures" with the word --measure--.

Column 6, Claim 6, Line 16, please replace the word "adjusts" with the word --adjust--.

Column 6, Claim 7, Line 20, please replace the word "controls" with the word --control--.

Column 6, Claim 8, Line 25, please replace the word "measures" with the word --measure--.

Column 6, Claim 9, Line 29, please replace the word "measures" with the word --measure--.

Column 6, Claim 10, Line 34, please replace the word "compares" with the word --compare--.

Column 6, Claim 12, Line 41, please delete the word "a" between the words "wherein" and "the".

Column 6, Claim 13, Line 45, please delete the word "a" between the words "wherein" and "the".

Signed and Sealed this
Fourteenth Day of January, 2025

Derrick Brent
*Acting Director of the United States Patent and Trademark Office*